(12) United States Patent
Hielscher et al.

(10) Patent No.: US 10,895,227 B2
(45) Date of Patent: Jan. 19, 2021

(54) ASSEMBLY FOR RECEIVING A FLUID SUBJECTED TO FLUCTUATING PRESSURE, IN PARTICULAR IN THE INTAKE MANIFOLD OF AN INTERNAL COMBUSTION ENGINE

(71) Applicant: MANN+HUMMEL GmbH, Ludwigsburg (DE)

(72) Inventors: Hans-Peter Hielscher, Winnenden (DE); Helmut Neuschwander, Ludwigsburg (DE); Alexander Korn, Gueglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/508,367

(22) Filed: Jul. 11, 2019

(65) Prior Publication Data

US 2020/0018271 A1 Jan. 16, 2020

(30) Foreign Application Priority Data

Jul. 11, 2018 (DE) .......................... 10 2018 116 785

(51) Int. Cl.
*F02M 35/10* (2006.01)
*F02M 35/04* (2006.01)
*F02M 35/104* (2006.01)

(52) U.S. Cl.
CPC ...... *F02M 35/10354* (2013.01); *F02M 35/04* (2013.01); *F02M 35/104* (2013.01); *F02M 35/10268* (2013.01)

(58) Field of Classification Search
CPC F16B 5/0275; F16B 25/0057; F16B 25/0063; F16B 25/0031
USPC ...................................................... 123/184.21
See application file for complete search history.

(56) References Cited

U.S. PATENT DOCUMENTS

| | | | | | |
|---|---|---|---|---|---|
| 310,229 | A | * | 1/1885 | Seely | ............................. 16/102 |
| 1,576,413 | A | * | 3/1926 | Cubitt | ..................... F16B 39/16 411/263 |
| 1,937,737 | A | * | 12/1933 | Vodoz | ..................... E21C 31/00 299/72 |
| 1,939,737 | A | * | 12/1933 | Thomson | ............. B25D 17/082 411/411 |
| 4,729,776 | A | * | 3/1988 | Elliff | ..................... F02M 29/06 123/592 |
| 4,781,351 | A | * | 11/1988 | Parapetti | ............. G01B 5/0002 248/288.11 |

(Continued)

FOREIGN PATENT DOCUMENTS

| | | | |
|---|---|---|---|
| DE | 102012017087 B3 * | 2/2014 | ....... F02M 35/10078 |
| DE | 102012017087 B3 | 2/2014 | |
| DE | 102013203095 A1 | 8/2014 | |

*Primary Examiner* — Long T Tran
*Assistant Examiner* — James J Kim
(74) *Attorney, Agent, or Firm* — James Hasselbeck

(57) ABSTRACT

An assembly for receiving a fluid subjected to fluctuating pressure has a housing with at least two housing parts. A tensioning bolt connects the at least two housing parts to each other. The tensioning bolt has at least two spaced-apart threaded sections, wherein the at least two threaded sections each are screwed into a respective counter thread in the at least two housing parts. The assembly can be a suction pipe or an air filter device of an internal combustion engine.

11 Claims, 3 Drawing Sheets

(56) References Cited

U.S. PATENT DOCUMENTS

| | | | | |
|---|---|---|---|---|
| 5,746,039 A * | 5/1998 | Nystrom | .................... | E04C 3/04 |
| | | | | 411/387.1 |
| 6,053,653 A * | 4/2000 | Tanaka | .................. | F16B 5/0275 |
| | | | | 29/525.11 |
| 6,053,683 A * | 4/2000 | Cabiran | .................. | F16B 37/14 |
| | | | | 411/372.6 |
| 6,125,526 A * | 10/2000 | Wierzchon | ............ | F16B 5/0275 |
| | | | | 29/525.02 |
| 6,796,761 B2 * | 9/2004 | Mizuno | ................ | F16B 35/047 |
| | | | | 411/386 |
| 7,213,999 B2 * | 5/2007 | Haas | ..................... | F16B 5/0275 |
| | | | | 403/337 |
| 9,550,544 B2 * | 1/2017 | Takeuchi | ................ | B62K 21/12 |
| 9,908,414 B2 * | 3/2018 | Nonnenbroich | ....... | B60K 37/00 |
| 2009/0283069 A1 * | 11/2009 | Hellinger | ................ | F02D 9/105 |
| | | | | 123/337 |
| 2012/0048696 A1 * | 3/2012 | Liebetruth | ............. | H01H 3/022 |
| | | | | 200/338 |
| 2014/0345577 A1 * | 11/2014 | Meshenky | ............ | F28D 9/0043 |
| | | | | 123/542 |
| 2016/0010546 A1 * | 1/2016 | Nivarthi | .................. | F02B 77/11 |
| | | | | 49/465 |
| 2017/0335809 A1 * | 11/2017 | Newman | .......... | F02M 35/10039 |

\* cited by examiner

ASSEMBLY FOR RECEIVING A FLUID SUBJECTED TO FLUCTUATING PRESSURE, IN PARTICULAR IN THE INTAKE MANIFOLD OF AN INTERNAL COMBUSTION ENGINE

BACKGROUND OF THE INVENTION

The invention relates to an assembly for receiving a fluid subjected to fluctuating pressure, in particular in the intake manifold of an internal combustion engine, comprising a housing, wherein at least two housing parts of the housing are connected by a tensioning bolt.

Charge air coolers are known which are arranged in the intake manifold of internal combustion engines and are used for cooling the compressed intake air. The charge air cooler is exposed to periodic pressure fluctuations that, while the internal combustion engine is running, are produced in the upstream intake manifold. Usually, the housing walls of the housing of the charge air cooler are supported relative to each other in order to provide for stabilization and to prevent that the pressure fluctuations in the charge air cooler cause leakages.

SUMMARY OF THE INVENTION

It is the object of the invention to provide with simple constructive measures an assembly for receiving a fluid subjected to fluctuating pressure, in particular in the intake manifold of an internal combustion engine, in such a way that pressure tightness and thus the proper function of the assembly is ensured permanently.

This object is solved according to the invention in that the tensioning bolt is embodied as a multi-tensioning bolt and comprises at least two spaced-apart threaded sections, wherein each threaded section is screwed into a respective counter thread in the housing parts.

The dependent claims provide expedient further embodiments.

The assembly according to the invention is preferably used in the periphery of an internal combustion engine, in particular in the intake manifold of the internal combustion engine, and serves for receiving a fluid subjected to fluctuating pressure, in particular combustion air. The assembly is, for example, a suction pipe with integrated charge air cooler that is arranged downstream of a compressor in the intake manifold. The charge air cooler is used for cooling the combustion air that is compressed by the compressor and is arranged upstream of the cylinder inlets of the internal combustion engine.

As an assembly that serves for receiving a fluid subjected to fluctuating pressure, for example, an air filter device is conceivable also which can also be integrated in the intake manifold of an internal combustion engine and is used for filtration of the supplied combustion air.

The combustion air in the intake manifold is subjected to pressure fluctuations that are produced while the internal combustion engine is running and have an effect even in the intake manifold. These pressure fluctuations constitute stress in particular for the housing of the assembly. In order to ensure permanent seal-tightness of the assembly, in particular of the housing of the assembly, at least two housing parts of the housing are connected and supported relative to each other by at least one tensioning bolt. The tensioning bolt is configured as a multi-tensioning bolt and comprises at least two spaced-apart threaded sections wherein each threaded section is screwed into a respective counter thread in the respective housing part.

This configuration has the advantage that each housing part is connected by its counter threads with a threaded section of the tensioning bolt. By engagement of the threaded section of the tensioning bolt in the counter thread in each housing part, an axial support—relative to the longitudinal axis of the tensioning bolt—in both axial directions is ensured. Therefore, excess pressure forces, which are directed at pushing apart oppositely positioned housing walls, as well as vacuum forces, which are directed at compressing oppositely positioned housing parts, can be absorbed by the tensioning bolt. The forces that are produced by the pressure fluctuations in the interior of the assembly are transmitted by the counter thread in the respective housing part to the threaded sections of the tensioning bolt. In this way, the relative position of the housing parts relative to each other is fixed and a stabilization of the assembly when exposed to pressure fluctuations is achieved.

A further advantage of the assembly with the tensioning bolt which comprises several spaced-apart threaded sections resides in that, already when screwing in the tensioning bolt, a defined fixed spacing of the oppositely positioned housing parts connected by the tensioning bolt is ensured. In this way, for example, a desired inwardly positioned gap between the charge air cooler or the filter medium body and the housing walls of the assembly can be adjusted or ensured.

The tensioning bolt comprises at least two axially spaced-apart threaded sections wherein each threaded section engages a counter thread in a housing part. In the embodiment as a double tensioning bolt, the latter comprises two spaced-apart threaded sections which are each correlated with a housing part. Possible is however also an embodiment with more than two threaded sections, for example, three threaded sections, whereby a fixation and stabilization with a corresponding number of housing parts or of a charge air cooler arranged in the housing or of a filter medium body is possible.

The threaded sections of the tensioning bolt are positioned advantageously axially spaced apart with an intermediately positioned thread-free section relative to each other. However, embodiments are also possible that are provided with a continuous thread on the tensioning bolt, wherein the continuous thread can be divided into two or more threaded sections which, after mounting, engage a respective counter thread in each housing part, respectively.

According to an advantageous embodiment, the various threaded sections of the tensioning bolt have the same thread pitch. It is ensured that, by screwing in the tensioning bolt and by engagement of the threaded sections in the respective counter threads, the housing parts maintain their position relative to each other. During the screw-in action, the relative position of the housing parts relative to each other is not changed.

In an alternative embodiment, on the other hand, it is provided that the threaded sections of the tensioning bolt comprise a different thread pitch. When screwing in the tensioning bolt, the relative position of the housing parts relative to each other is changed so that the housing parts are subjected to pretension. As needed, such a pretension may be desirable.

According to a further advantageous embodiment, the threaded sections of the tensioning bolt have a different outer diameter. This embodiment has an advantageous effect in particular in regard to producing the housing of the assembly. The housing of the assembly is comprised preferably of housing parts which are produced by a plastics injection molding process. Advantageously, one housing part is provided with a blind bore recess with closed bottom into which an end face of the tensioning bolt with the threaded section with smaller outer diameter is projecting. This makes it possible to demold, from the same side, the housing parts of the assembly produced by an injection molding process. The closed bottom of the blind bore recess ensures at this side seal-tightness even without additional seal.

According to a further advantageous embodiment, at least two threaded sections, advantageously all threaded sections, of the tensioning bolt have the same outer diameter.

In the embodiment with different outer diameters as well as in the embodiment with same outer diameter, different thread pitches but also same thread pitches in the threaded sections are conceivable.

In an alternative embodiment, in the embodiment with different outer diameters as well as in the embodiment with the same outer diameters, different thread types are conceivable, for example, a plastics-suitable thread, in particular for a plastic housing, and a metric thread for a metal component, in particular a charge air cooler or a metal housing part.

The tensioning bolt comprises advantageously a radially expanded bolt head which contacts an exterior side of a housing part. It can be expedient to provide between the exterior side of the housing part and the inner side of the bolt head a sealing element that is axially compressed by the screw force of the screwed-in tensioning bolt and effects a flow-tight closure. In this way, it is ensured that the interior of the assembly is sealed tightly with regard to flow.

In an alternative embodiment, a radially expanded bolt head of the tensioning bolt can also be eliminated. In this case, the bolt head of the tensioning bolt is embodied radially no larger than the nearest threaded section.

Advantageously, an inner polygon socket or outer polygon head is provided at the bolt head.

According to a further advantageous embodiment, at least one threaded section of the tensioning bolt is connected by means of an adhesive substance or sealing substance with the counter thread in the housing into which the respective threaded section is screwed. Embodiments of the substance are possible in which it has an adhesive action as well as a sealing action but also embodiments in which the substance develops only a sealing action. The adhesive or sealing substance is, for example, applied in the form of a coating onto the threaded section of the tensioning bolt so that, when screwing in the tensioning bolt, the adhesive or sealing substance develops its adhesive or sealing action between the threaded section of the tensioning bolt and the counter thread in the housing part.

The adhesive and sealing substance can be present, for example, in micro-encapsulated form, in particular in the form of beads that are applied onto a thread, in particular a threaded section of the tensioning bolt. When screwing in the threaded bolt, the beads burst and release the adhesive or sealing substance so that the desired adhesive or sealing action is obtained.

According to a further advantageous embodiment, the housing parts connected by the tensioning bolt form housing walls that are spaced apart from each other and substantially parallel. In particular, the housing parts can form parallel housing walls in the housing areas connected by the tensioning bolt. The parallelism of the housing walls can be maintained in the mounted state connected by the tensioning bolt.

According to a further expedient embodiment, the housing parts connected by the tensioning bolt can be designed as one piece, for example, in an embodiment of the assembly with a charge air cooler that is inserted laterally, transversely to the longitudinal axis of the tensioning bolt, into a housing. Optionally, the housing parts can be held together adjustably by a film hinge or the like. By the tensioning bolt, a stabilization and fixation of the housing parts in a desired relative position to each other is achieved.

However, conceivable is also a two-part separate embodiment of the housing parts that are connected by the tensioning bolt, for example, in an embodiment of the assembly with a charge air cooler that is received between two housing parts which are mounted in longitudinal direction of the tensioning bolt.

In addition to the at least one tensioning bolt, optionally further connecting elements can be arranged by means of which the housing parts are connected to each other.

BRIEF DESCRIPTION OF THE DRAWINGS

Further advantages and expedient embodiments can be taken from the additional claims, the figure description and the drawings.

In the Figures, same components are provided with same reference characters.

DESCRIPTION OF PREFERRED EMBODIMENTS

Figure 1:
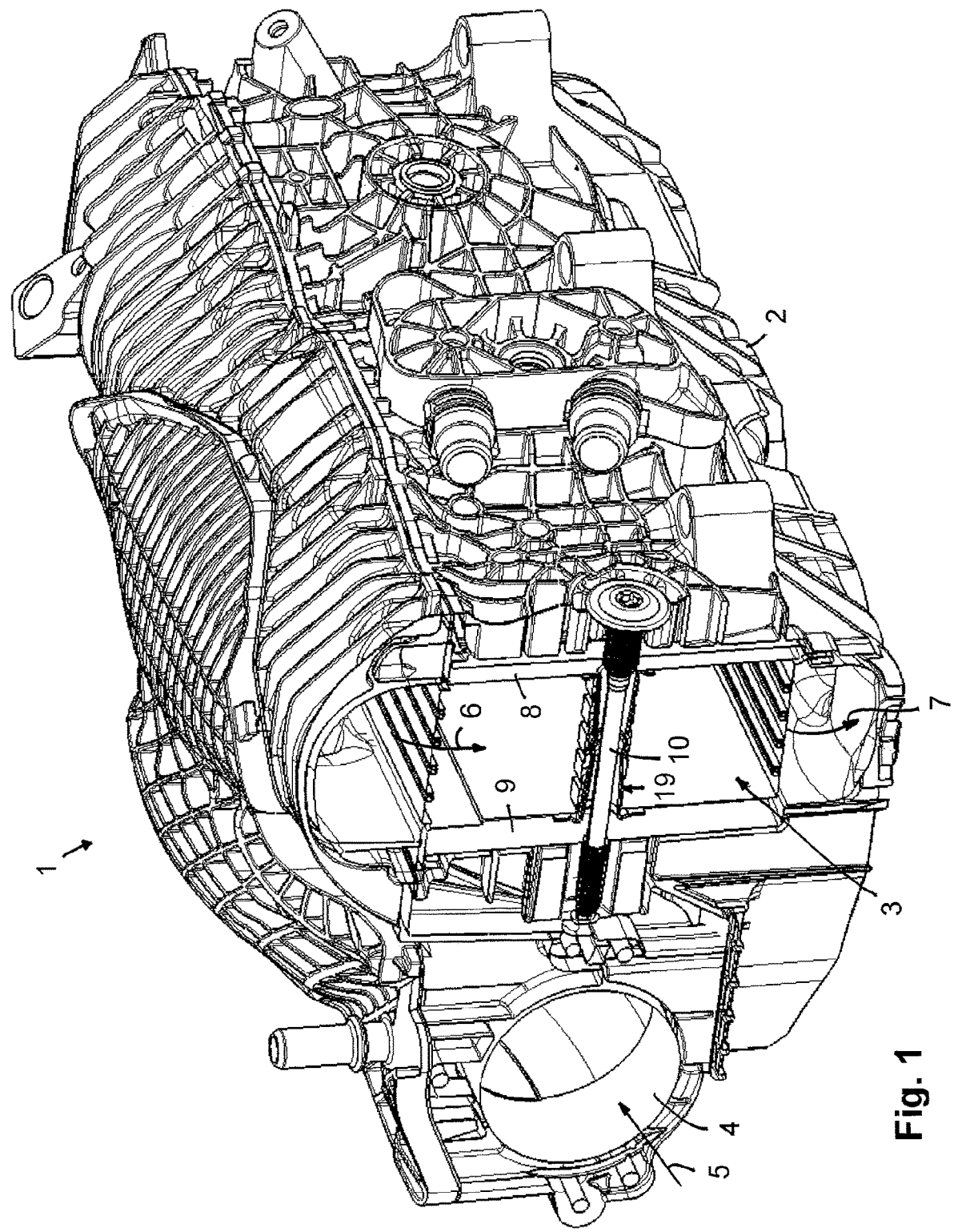
FIG. 1 shows in a perspective view a suction pipe in the intake manifold of an internal combustion engine, partially in section view, with an illustration of a tensioning bolt through a charge air cooler for connecting oppositely positioned parallel housing walls of the suction pipe.
Figure 2:
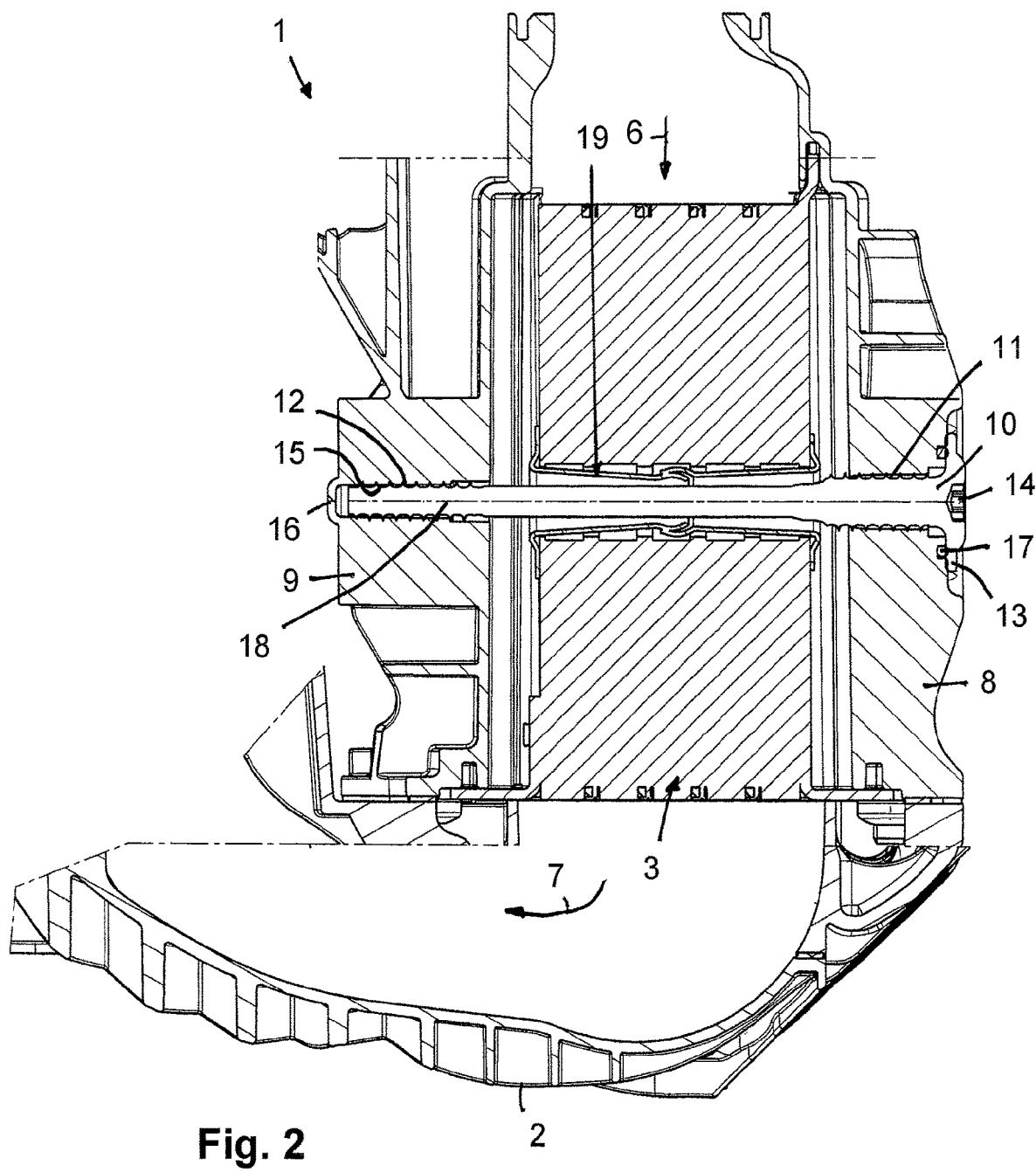
FIG. 2 shows a section view in the region of the housing walls of the suction pipe connected by the tensioning bolt.
Figure 3:
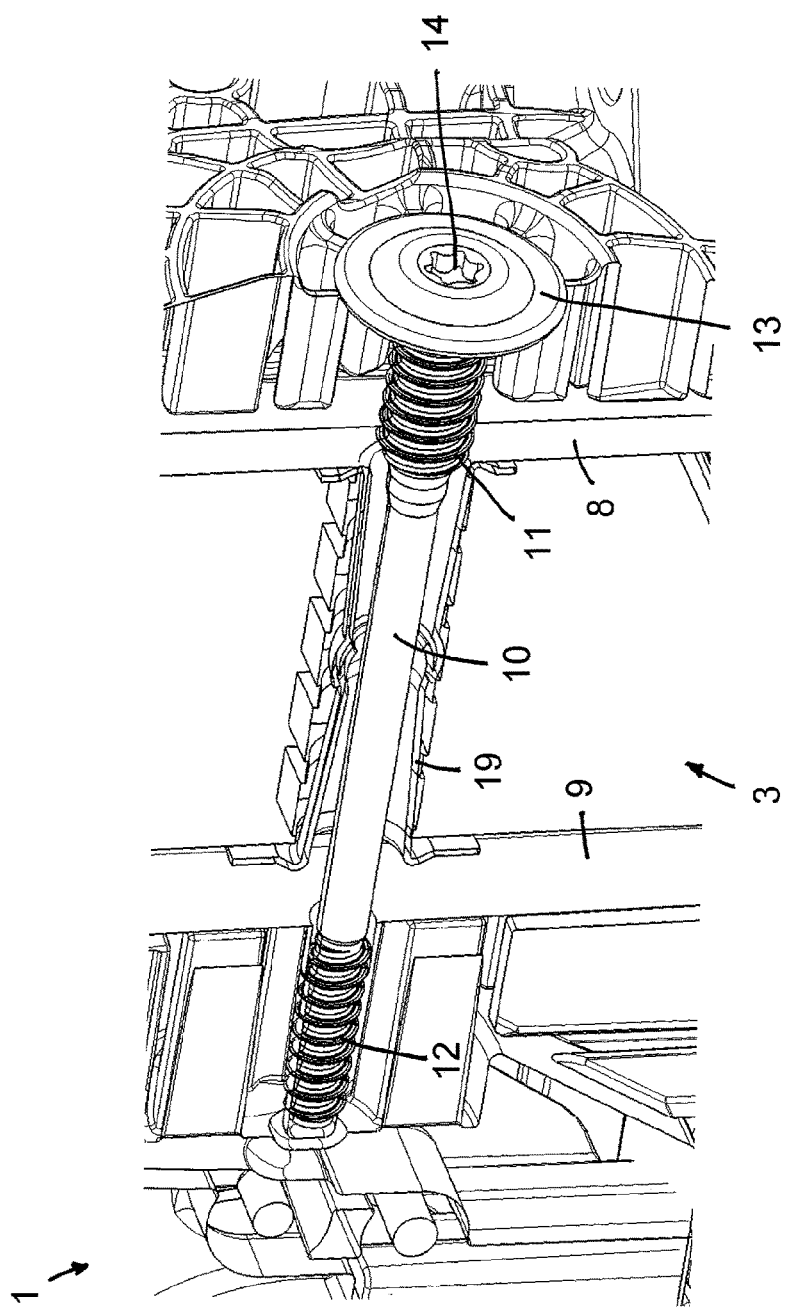
FIG. 3 shows a perspective illustration of the tensioning bolt with the connected housing walls.

In FIGS. 1 and 2 as well as in the detail view in FIG. 3, a suction pipe 1 is illustrated which is arranged in the intake manifold of an internal combustion engine and in which a charge air cooler 3 is integrated for cooling the compressed combustion air in the intake manifold. The suction pipe 1 comprises a housing 2 in which the charge air cooler 3 is received. As can be seen in FIG. 1, by means of a housing-associated intake socket 4, the combustion air is introduced according to arrow 5 into the suction pipe 1 and, according to the additional arrows 6 and 7, is guided farther through the charge air cooler 3 and subsequently out of the suction pipe 1 and in the direction of the inlet of the internal combustion engine.

The housing 2 of the suction pipe 1 comprises in the region of the charge air cooler 3 two housing walls 8 and 9, each forming a housing part, which delimit a receiving space for the charge air cooler 3 and are positioned parallel to each other and spaced apart from each other. The two oppositely positioned housing walls 8 and 9 are connected to each other and fixed relative to each other by a tensioning bolt 10 that is embodied as a double tensioning bolt and comprises two axially spaced-apart threaded sections 11 and 12, wherein the axial spacing relates to the longitudinal axis of the tensioning bolt 10. The first threaded section 11 is located immediately adjacent to a radially expanded bolt head 13 of the tensioning bolt wherein an inner polygon socket 14 is provided in the bolt head 13 for insertion and actuation by means of a socket wrench.

Figure 4:
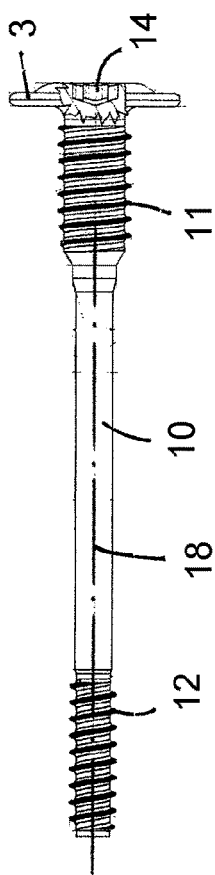
FIG. 4 shows an individual illustration of the tensioning bolt with two axially spaced-apart threaded sections with different outer diameter.

The second threaded section 12 is located immediately adjacent to the free end face of the tensioning bolt 10 which is positioned axially opposite the bolt head 13. The threaded sections 11 and 12 comprise the same thread orientation (also known as "handedness", i.e.: right handed or left handed thread, see FIG. 4) and the same thread pitch but a different outer diameter wherein the outer diameter of the first threaded section 11 neighboring the bolt head 13 is greater than the outer diameter of the second threaded section 12 neighboring the end face. The outer diameter of the first threaded section 11 is, for example, at least by 50% larger than the outer diameter of the second threaded section 12. The different outer diameters of the threaded sections 11 and 12 enable demolding of the housing 2 from the same side when producing the housing as a plastics injection molded part. This makes it also possible, as can be seen in FIG. 2, to introduce into the second housing part 9 a blind bore recess 15 with a closed bottom 16, wherein the tensioning bolt 10 projects with its second threaded section 12 into the blind bore recess 15. Due to the embodiment as a blind bore recess 15, at this location an absolute flow-tight sealing of the interior in the housing 2 with the charge air cooler 3 is provided. A sealing element at this location is not needed.

At the inner side of the bolt head 13 and at the same time at the outwardly positioned side of the first housing wall 8, a sealing element 17 is provided, in particular a sealing ring that is positioned between the housing wall 8 and the bolt head 13 and is axially compressed by the bolt head 13. In this way, in the region of the first housing wall 8, a flow-tight sealing action is provided so that, by means of the recess in the housing wall 8 through which the tensioning bolt 10 is passed, no fluid can escape from the interior of the housing to the exterior.

The embodiment of the tensioning bolt 10 as a double tensioning bolt with the two axially spaced-apart threaded sections 11 and 12, between which a section without thread is located, and the screwing action of each threaded section 11 and 12 with the correlated counter thread in the recesses in the housing walls 8 and 9 enables a fixation of the housing walls relative to each other in both axial directions, relative to the longitudinal axis 18 of the tensioning bolt 10. Pressure fluctuations of the combustion air which is guided through the suction pipe 1 are absorbed by the tensioning bolt 10 in case of increasing as well as decreasing pressure by means of the threaded sections 11 and 12 so that the axial relative position of the housing walls 8 and 9 to each other in both axial directions is fixed. A permanent fixed connection between the tensioning bolt 10 and the housing walls 8 and 9 is produced so that seal-tightness is ensured for a long period of time.

The axial length of each threaded section is dimensioned such that a reliable and fixed connection with each housing wall 8 and 9 is ensured. The axial length of the two threaded sections 11 and 12 is at least approximately the same. The axial length of each threaded section amounts to, for example, approximately one fourth of the total length of the tensioning bolt 10.

For producing the connection, the tensioning bolt 10 with the threaded section 12 positioned adjacent to the end face of the tensioning bolt is first passed through the recess in the first housing wall 8 as well as through a sleeve 19 which is provided in the charge air cooler 3 and which extends completely through the charge air cooler 3. The tensioning bolt 10 is inserted so far into the housing 2 that the threaded section 12 reaches the region of the blind bore recess 15. In the embodiment of the housing as a plastics injection molded part, expediently the threaded section 12 cuts the counter thread into the inner wall of the blind bore recess 15. However, it can also be expedient to arrange in the blind bore recess 15 a pre-manufactured counter thread into which the threaded section 12 of the tensioning bolt 10 is screwed.

Simultaneously with screwing the threaded section 12 into the counter thread in the blind bore recess 15 or cutting the counter thread into the blind bore recess 15, the threaded section 11, in the region of the first housing wall 8, is also screwed into the correlated counter thread at the inner wall of the recess in the housing wall 8. In a corresponding manner as described in regard to the second housing wall 9, the counter thread is produced in the first housing wall 8 also by cutting by means of the threaded section 11 of the tensioning bolt 10. Alternatively, the counter thread in the recess in the first housing wall 8 is pre-manufactured and the threaded section 11 is screwed into the pre-manufactured counter thread.

Screwing is carried out to such an extent that the bolt head 13 contacts the exterior side of the housing wall 8 or a sufficiently high axial compression is produced at the sealing element 17. The screwing action can be carried out with torque control in that a tightening torque is preset and, when reached, the screwing process is terminated.

What is claimed is:

1. An assembly for receiving a fluid subjected to fluctuating pressure, the assembly comprising:
    a housing comprising:
        a first housing wall;
        a second housing wall oppositely positioned from the first housing wall,
        wherein the first housing wall is spaced apart from the second housing wall, forming a receiving space therebetween, the receiving space subject to fluctuating pressure and vacuum forces directed at pushing apart the oppositely positioned housing walls, as well as vacuum forces, which are directed at compressing together the oppositely positioned housing walls;
    a double tensioning bolt comprising:
        a first threaded section having:
            a first thread pitch; and
            a first outer diameter;
        a second threaded section spaced axially away from the first threaded section, the second threaded section having:
            a second thread pitch; and
            a second outer diameter;
        wherein the first thread pitch matches the second thread pitch;
        wherein the first outer diameter is greater the second outer diameter;
    wherein the first threaded section is threadably engaged into a first counter thread in the first housing wall;
    wherein the second threaded section is threadably engaged into a second counter thread in the second housing wall;
    wherein the first threaded section and the second threaded section have a same thread handedness such that rotating the double tensioning bolt in a first screwing direction advances the first threaded section axially into the first counter thread of the first housing wall and advances the second thread section axially in the second counter thread of the second housing wall;

wherein the matching first and second thread pitches maintains a fix axial spacing along the double tensioning bolt between the first housing wall and the second housing wall, the spacing fixed as the double tensioning bolt is advanced in the counter threads of the first and second housing walls;

wherein the fluctuating pressure or vacuum forces acting on the spaced apart first and second housing walls are absorbed by the double tensioning bolt in case of increasing as well as decreasing pressure by means of the first and second threaded sections so that the axial spacing of the first housing wall to the second housing wall is held to a fixed spacing by the double tensioning bolt.

2. The assembly according to claim 1, wherein
the at least two housing parts include
a housing part comprising a blind bore recess with a closed bottom,
wherein an end face of the double tensioning bolt projects into the blind bore recess.

3. The assembly according to claim 1, wherein
the at least two threaded sections of the double tensioning bolt include one or more threaded sections connected by an adhesive or sealing substance with the respective counter thread.

4. The assembly according to claim 3, wherein
the adhesive or sealing substance is applied onto the one or more threaded sections prior to screwing in the double tensioning bolt into the respective counter threads.

5. The assembly according to claim 1, wherein
the housing comprises at least two housing parts;
wherein a first housing part of the at least two housing parts has the first housing wall;
wherein a second housing part of the at least two housing parts has the second housing wall;
wherein the at least two housing parts connected by the double tensioning bolt form spaced-apart parallel housing walls.

6. The assembly according to claim 5, wherein
the at least two housing parts connected by the double tensioning bolt are embodied as one piece.

7. The assembly according to claim 5, wherein
the at least two housing parts connected by the tensioning bolt are embodied as two separate parts.

8. The assembly according to claim 1, wherein
the housing is produced by plastics injection molding.

9. The assembly according to claim 1, wherein
the assembly is a suction pipe for an internal combustion engine.

10. The assembly according to claim 9, further comprising
a charge air cooler, wherein the double tensioning bolt passes through the charge air cooler.

11. The assembly according to claim 1, wherein
the assembly is an air filter device for an internal combustion engine.

* * * * *